(12) United States Patent
Sasaki et al.

(10) Patent No.: US 8,784,253 B2
(45) Date of Patent: Jul. 22, 2014

(54) TRANSMISSION RATIO VARIABLE DEVICE

(71) Applicant: JTEKT Corporation, Osaka (JP)

(72) Inventors: Hitoshi Sasaki, Chiryu (JP); Satoshi Motoyama, Knoxville, TN (US); Tomonari Yamakawa, Aichi (JP); Masanori Natsume, Toyokawa (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/955,602

(22) Filed: Jul. 31, 2013

(65) Prior Publication Data

US 2014/0045636 A1 Feb. 13, 2014

(30) Foreign Application Priority Data

Aug. 8, 2012 (JP) ................................. 2012-176001

(51) Int. Cl.
*F16H 1/32* (2006.01)
(52) U.S. Cl.
USPC .......................................... 475/150; 475/164
(58) Field of Classification Search
CPC ................................ F16H 1/321; F16H 23/10
USPC ...................................... 475/4, 150, 151, 164
See application file for complete search history.

(56) References Cited

U.S. PATENT DOCUMENTS

| 2007/0249453 A1* | 10/2007 | Sugitani ............................ 475/4 |
| 2008/0251311 A1 | 10/2008 | Waibel et al. |
| 2009/0200100 A1* | 8/2009 | Arbanas ........................ 180/447 |
| 2010/0179012 A1* | 7/2010 | Kuroumaru et al. .......... 475/164 |

* cited by examiner

*Primary Examiner* — Edwin A Young
(74) *Attorney, Agent, or Firm* — Oliff PLC

(57) ABSTRACT

A second shaft is configured by a shaft portion extending outside a housing in which a nutation gear mechanism is housed, a housing portion, and a cylindrical portion. A communicating hole, through which an outside and an inside of the housing portion communicate with each other, is formed in the shaft portion. A preload applying mechanism includes a preload adjusting plug that is screwed to the housing portion and is able to be operated from outside through the communicating hole, a wave washer compressed in accordance with a position of the preload adjusting plug, and a lock nut that is screwed to the housing portion of the second shaft so as to press the preload adjusting plug toward the nutation gear mechanism.

10 Claims, 7 Drawing Sheets

TRANSMISSION RATIO VARIABLE DEVICE

INCORPORATION BY REFERENCE/RELATED APPLICATION

This application claims priority to Japanese Patent Application No. 2012-176001 filed on Aug. 8, 2012 the disclosure of which, including the specification, drawings and abstract, is incorporated herein by reference in its entirety.

BACKGROUND OF THE INVENTION

1. Field of the Invention

The invention relates to a transmission ratio variable device.

2. Discussion of Background

Conventionally, there has been a transmission ratio variable device that changes a rotation transmission ratio (a steering gear ratio) between input and output shafts by adding motor-driven rotation to rotation of the input shaft based on a steering operation by using a differential mechanism and transmitting resultant rotation to the output shaft. In US2008/0251311 A1, a transmission ratio variable device is described in which a nutation gear mechanism is employed as a differential mechanism. The nutation gear mechanism includes a first gear that rotates together with an input shaft, a fourth gear that rotates together with an output shaft, and a nutation gear. The nutation gear includes a second gear that meshes with the first gear, and a third gear that meshes with the fourth gear, and the nutation gear rotates about an axis that is inclined with respect to an axis of the first and fourth gears. In such a transmission ratio variable device, a good meshing state of the nutation gear mechanism is maintained by applying an axial preload to the nutation gear mechanism using an elastic member such as a spring.

In the conventional structure stated above, a deformation amount of the elastic member may vary due to an assembly error and the like, in an early stage of manufacturing of the transmission ratio variable device. As a result, the preload applied to the nutation gear mechanism may vary, and it may be difficult to maintain the good meshing state of the nutation gear mechanism. More specifically, if the preload applied to the nutation gear mechanism is too small, disengagement between the first gear and the second gear, or between the third gear and the fourth gear, that is so-called "ratcheting", may occur when, for example, a large load is applied to the nutation gear mechanism. Meanwhile, if the preload is too large, for example, meshing friction between the gears may be increased, which may inhibit smooth operations of the nutation gear mechanism.

SUMMARY OF THE INVENTION

The invention provides a transmission ratio variable device configured such that variation in a preload applied to a nutation gear mechanism due to an assembly error and the like is reduced, and a good meshing state of the nutation gear mechanism is maintained.

According to a feature of an example of the invention, there is provided a transmission ratio variable device that adds motor-driven rotation to rotation of an input shaft by using a differential mechanism, and transmits resultant rotation to an output shaft, wherein: a nutation gear mechanism is employed as the differential mechanism, and the nutation gear mechanism includes a first gear that rotates together with the input shaft, a fourth gear that rotates together with the output shaft, and a nutation gear that includes a second gear that meshes with the first gear and a third gear that meshes with the fourth gear, the nutation gear rotating about an axis that is inclined to an axis of the first and fourth gears; one of the input shaft and the output shaft has a shaft portion projecting outside a housing that houses the nutation gear mechanism, and a communicating hole, through which an outside and an inside of the housing communicate with each other, is formed in the shaft portion; and the transmission ratio variable device includes preload applying means including a preload adjusting plug that is screwed to one of the input shaft and the output shaft and is able to be operated from outside through the communicating hole, the preload applying means applying an axial preload to the nutation gear mechanism in accordance with a position of the preload adjusting plug.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
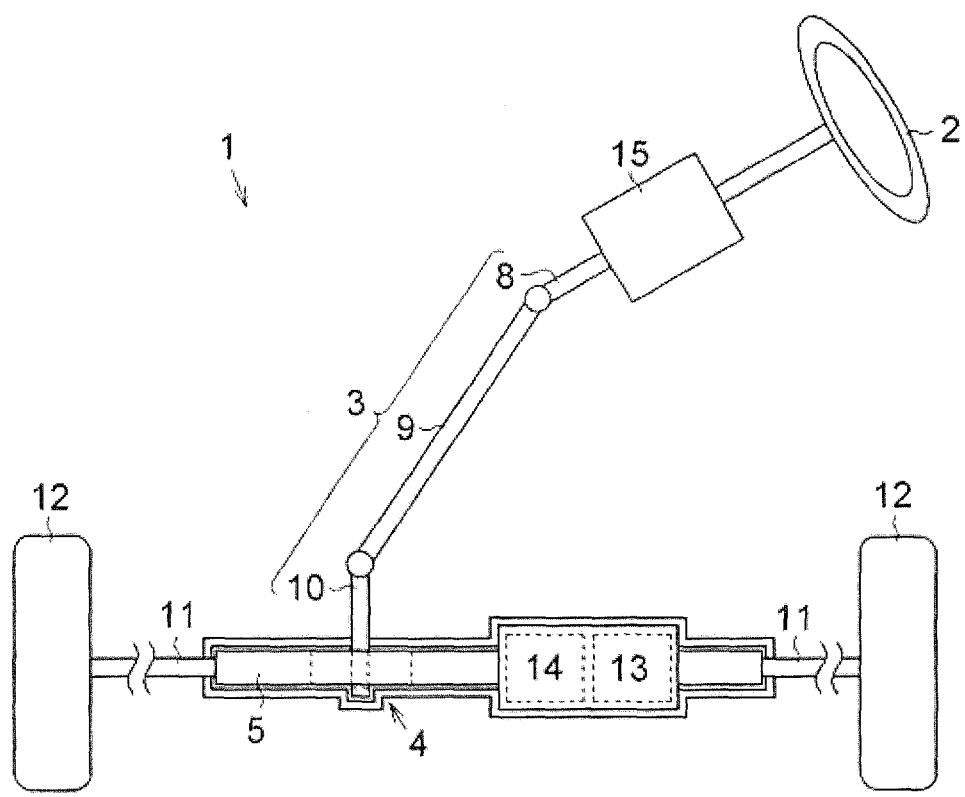
FIG. 1 is a schematic structural view of a vehicle steering system including a transmission ratio variable device.

A first embodiment will be described with reference to the drawings. As shown in FIG. 1, in a vehicle steering system 1, a pinion (not shown) provided in a steering shaft 3 to which a steering wheel 2 is fixed meshes with a rack shaft 5 through a rack-and-pinion mechanism 4. Thus, rotation of the steering shaft 3 in association with a steering operation is converted into a linear reciprocating motion of the rack shaft 5 by the rack-and-pinion mechanism 4. The steering shaft 3 is formed by connecting a column shaft 8, an intermediate shaft 9, and a pinion shaft 10. A linear reciprocating motion of the rack shaft 5 in association with rotation of the steering shaft 3 is transmitted to knuckles (not shown) through tie rods 11 connected to respective ends of the rack shaft 5. Thus, a rudder angle of steered wheels 12, in other words, a traveling direction of a vehicle is changed. The vehicle steering system 1 according to this embodiment is configured as a so-called "rack assist type electric power steering system", in which rotation of a motor 13 is converted to a reciprocating motion of the rack shaft 5 by a ball screw mechanism 14 and thus transmitted so that the motor toque is applied to a steering system as an assist force.

Figure 2:
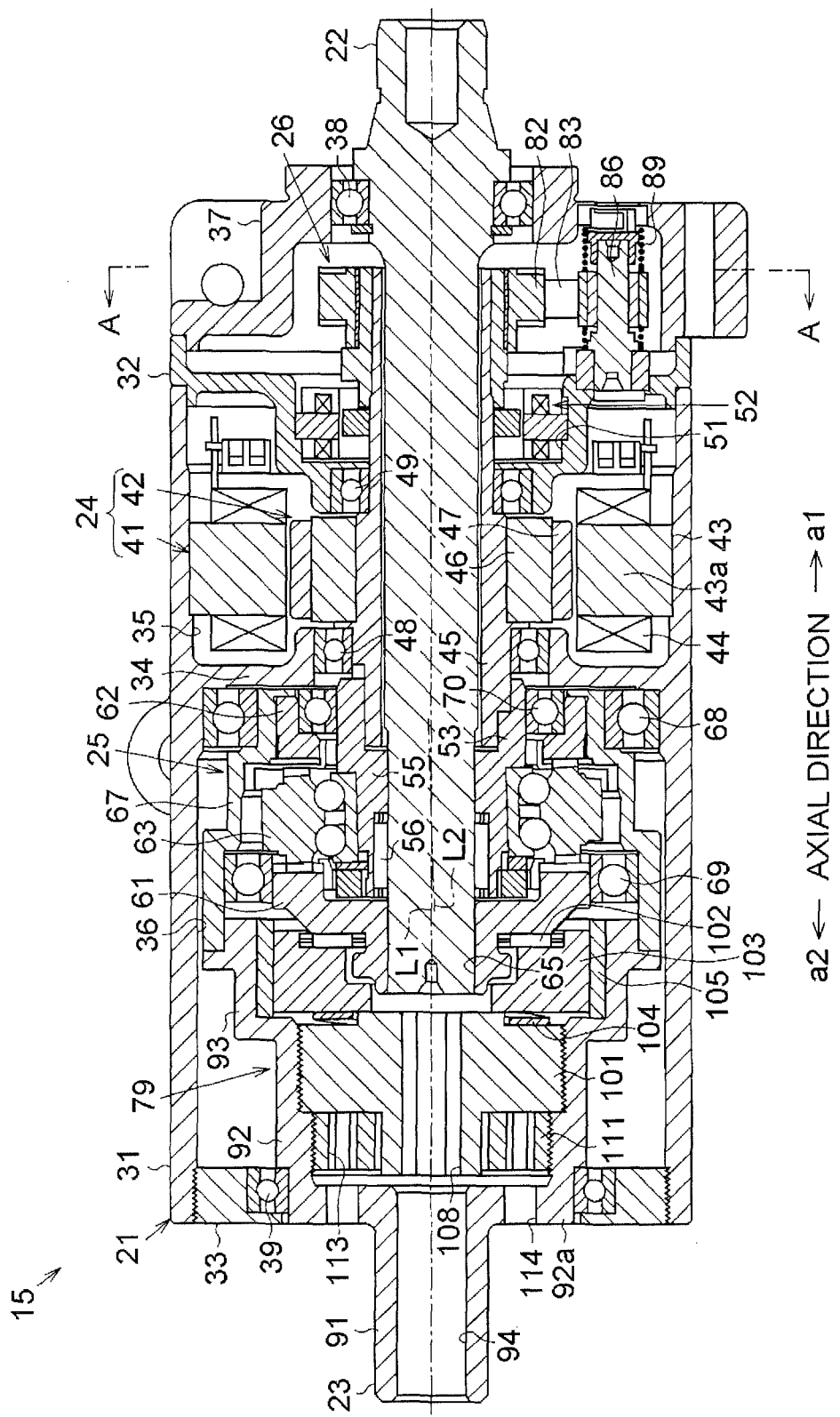
FIG. 2 is a sectional view of a transmission ratio variable device according to a first embodiment.

In the vehicle steering system 1, a transmission ratio variable device 15 is provided in an intermediate portion of the column shaft 8. The transmission ratio variable device 15 changes a ratio of a rudder angle (a tire angle) of the steered wheels 12 to a rudder angle (a steering angle) of the steering wheel 2, in other words, a transmission ratio (a steering gear ratio). As shown in FIG. 2, the transmission ratio variable device 15 includes a substantially cylindrical housing 21 fixed to a vehicle body (not shown) of a vehicle, a first shaft 22 that serves as an input shaft to which rotation in association with a steering operation is input, and a second shaft 23 that serves as an output shaft connected to the intermediate shaft 9 (see FIG. 1). The first shaft 22 and the second shaft 23 are supported so as to rotate with respect to the housing 21, and constitute the foregoing column shaft 8. The transmission ratio variable device 15 includes a motor 24 housed in the housing 21, and a nutation gear mechanism 25 that serves as a differential mechanism. The transmission ratio variable device 15 adds motor-driven rotation to rotation of the first shaft 22 by using the nutation gear mechanism 25 and transmits resultant rotation to the second shaft 23. The transmission ratio variable device 15 also includes a lock mechanism 26 that is able to mechanically fix a transmission ratio by locking (restraining) rotation of the motor 24 as necessary.

The housing 21 includes a cylindrical housing body 31 in which the motor 24 and the nutation gear mechanism 25 are housed, an annular upper cover 32 that covers one axial end side (a right side in FIG. 2: a side indicated by an arrow a1 (an arrow a1-side)) of the housing body 31, and an annular lower cover 33 that covers the other axial end side (a left side in FIG. 2: a side indicated by an arrow a2 (an arrow a2-side)) of the housing body 31. In a substantially center of the housing body 31, an annular partition wall portion 34, which extends toward a radially inner side, is formed. An area on the arrow a1-side of the partition wall portion 34 serves as a motor chamber 35 in which the motor 24 is housed, and an area on the arrow a2-side of the partition wall portion 34 serves as a gear chamber 36 in which the nutation gear mechanism 25 is housed. Also, the housing 21 includes a bottomed cylindrical lock case 37 that is fixed to the arrow a1-side of the upper cover 32. The lock mechanism 26 is housed in the lock case 37. The first shaft 22 is supported by a bearing 38 that is provided in a bottom portion of the lock case 37 so that the first shaft 22 is rotatable. The second shaft 23 is supported by a bearing 39 that is provided in the lower cover 33 so that the second shaft 23 is rotatable. The first shaft 22 and the second shaft 23 are arranged coaxially with each other.

The motor 24 is configured as a brushless motor that includes a stator 41 fixed within the motor chamber 35, and a rotor 42 provided inside the stator 41 so that the rotor 42 is rotatable. More specifically, the stator 41 has a stator core 43 that is formed in an annular shape, and coils 44 wound around teeth 43a of the stator core 43. Meanwhile, the rotor 42 has an annular rotor core 46 fixed to an outer periphery of a motor shaft 45, and a permanent magnet 47 fixed to an outer periphery of the rotor core 46. The motor shaft 45 is formed in a hollow shape, and the first shaft 22 is fitted and inserted into the motor shaft 45 so as to be coaxial with the motor shaft 45. An axial length of the motor shaft 45 is set so as to be larger than an axial length of the motor chamber 35. An axial end portion of the motor shaft 45 on the arrow a1-side is arranged in the lock case 37, and an axial end portion of the motor shaft 45 on the arrow a2-side is arranged in the gear chamber 36. The motor shaft 45 is supported by a bearing 49 provided in the upper cover 32, and by a bearing 48 provided in the partition wall portion 34 so that the motor shaft 45 is rotatable. A recessed housing portion 51, which is recessed toward the motor chamber 35-side, is formed in a center of the upper cover 32, and, a rotation angle sensor 52 (for example, a resolver) that detects a rotation angle of the rotor 42 is housed in the recessed housing portion 51.

Figure 3:
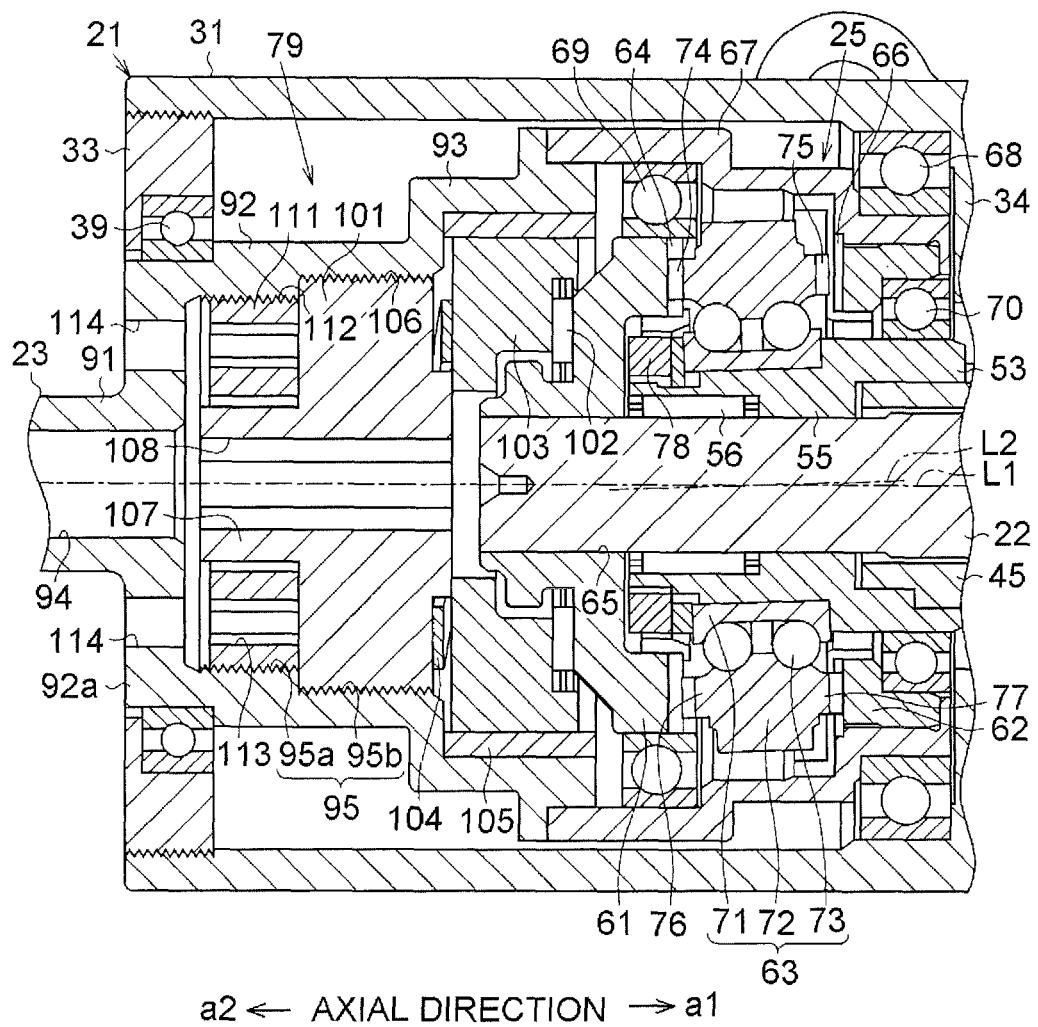
FIG. 3 is an enlarged sectional view of the transmission ratio variable device according to the first embodiment.

As shown in FIG. 2 and FIG. 3, an inclined shaft 53 is connected to the axial end portion of the motor shaft 45 on the arrow a2-side so that the inclined shaft 53 is rotatable together with the motor shaft 45. The inclined shaft 53 is provided with an inclined support portion 55 that has a shaft center L2 inclined with respect to a shaft center L1 of the motor shaft 45 (the shaft center of the first shaft 22 and the second shaft 23). An outer periphery of the inclined support portion 55 is formed in a cylindrical shape that is inclined with respect to the shaft center L1. A bearing 56 is disposed between the inclined shaft 53 and the first shaft 22.

The nutation gear mechanism 25 includes a first gear 61 that is connected to the first shaft 22 so as to be rotatable together with the first shaft 22, a fourth gear 62 that is connected to the second shaft 23 so as to be rotatable together with the second shaft 23, and a nutation gear 63 that is arranged between the first gear 61 and the fourth gear 62 and connected to the motor shaft 45 through the inclined shaft 53.

The first gear 61 is formed in a disc shape. On an outer peripheral edge of the first gear 61, a plurality of first teeth 64 projecting toward the arrow a1-side are arranged in a circumferential direction. In this embodiment, each of the first teeth 64 is arranged radially with respect to the first gear 61, and is constituted by a roller that is provided so as to be rotatable about an axis thereof. A through hole 65, which extends through the first gear 61 in an axial direction, is formed at a center of the first gear 61. As an axial end portion of the first shaft 22 is press-fitted into the through hole 65, the first gear 61 is coaxially connected to the first shaft 22 so as to be rotatable together with the first shaft 22. In other words, a shaft center of the first gear 61 coincides with a shaft center of the motor shaft 45.

The fourth gear 62 is formed in an annular shape. In the fourth gear 62, a plurality of fourth teeth 66 projecting toward the arrow a2-side are arranged in the circumferential direction. In this embodiment, similarly to the first teeth 64, each of the fourth teeth 66 arranged radially with respect to the fourth gear 62 and is constituted by a roller that is provided so as to be rotatable about an axis thereof. The fourth gear 62 is fixed to an inner periphery of a connecting cylinder 67 that is formed in a cylindrical shape, and the fourth gear 62 is connected to the second shaft 23 through the connecting cylinder 67. The connecting cylinder 67 is supported by a bearing 68 that is provided adjacent to the arrow a2-side of the partition wall portion 34 so that the connecting cylinder 67 is rotatable, and the connecting cylinder 67 is coaxially connected to the second shaft 23 so as to be rotatable together with the second shaft 23. In other words, the fourth gear 62 is coaxially connected to the second shaft 23 through the connecting cylinder 67 so that the fourth gear 62 is rotatable together with second shaft 23, and the shaft center of the fourth gear 62 coincides with the shaft center L1 of the motor shaft 45. Bearings 69 and 70 are provided between the connecting cylinder 67 and the first gear 61, and between the inclined shaft 53 and the fourth gear 62, respectively.

The nutation gear 63 includes a cylindrical inner ring 71, a cylindrical outer ring gear 72, and balls 73 provided between the inner ring 71 and the outer ring gear 72. A plurality of second teeth 74, which are able to mesh with the first teeth 64, are arranged in the circumferential direction on an arrow a2-side end face (a first gear 61-side end face) of the outer ring gear 72. Meanwhile, a plurality of third teeth 75, which are able to mesh with the fourth teeth 66, are arranged in the circumferential direction on an arrow a1-side end face (a fourth gear 62-side end face) of the outer ring gear 72. In other words, second and third gears 76 and 77 are constituted by the outer ring gear 72. In this embodiment, the number of the second teeth 74 is set to be smaller by one than the number of the first teeth 64, and the number of the third teeth 75 is set to be equal to the number of the fourth teeth 66. The inner ring 71 is connected to an outer periphery of the inclined support portion 55 by a fixing member 78 that is fixed to an arrow a2-side end portion of the inclined shaft 53 so that the inner ring 71 is rotatable together with the inclined shaft 53 (the motor shaft 45). In other words, a shaft center of the nutation gear 63 coincides with the shaft center L2 of the inclined support portion 55, and the nutation gear 63 rotates about an axis inclined with respect to the axis of the first and fourth gears 61 and 62. In the outer ring gear 72, only a part of the second gear 76 meshes with the first gear 61, and only a part of the third gear 77 meshes with the fourth gear 62. A meshing portion between the first gear 61 and the second gear 76, and a meshing portion between the fourth gear 62 and the third gear 77 are separated from each other by substantially 180 degrees about the shaft center of the first and the fourth gears 61 and 62. A preload is applied to the nutation gear mechanism 25 in the axial direction by a preload applying mechanism 79 so that the first gear 61 and the fourth gear 62 approach each other.

In the nutation gear mechanism 25 to which the first shaft 22, the second shaft 23, and the motor shaft 45 are connected as described above, rotation of the first shaft 22 is transmitted to the fourth gear 62 through the first gear 61 and then the nutation gear 63, and is then transmitted to the connecting cylinder 67 and the second shaft 23. When the motor 24 is driven, and the inclined shaft 53 connected to the motor shaft 45 rotates, the inclined support portion 55 has precession (nutation). Thus, the outer ring gear 72 precesses together with the inner ring 71 fixed to the inclined support portion 55, and the meshing portion between the first gear 61 and the second gear 76, and the meshing portion between the fourth gear 62 and the third gear 77 rotate in the same direction. As a result, a rotation difference between the first gear 61 and the second gear 76, and the fourth gear 62 and the third gear 77 based on a difference in the number of teeth is added to the rotation of the first shaft 22 as motor-driven rotation, and resultant rotation is transmitted to the second shaft 23. In other words, a rotation transmission ratio between the first shaft 22 and the second shaft 23, that is, a transmission ratio between the steering wheel 2 and the steered wheels 12, is changed in accordance with the motor-driven rotation.

Figure 4:
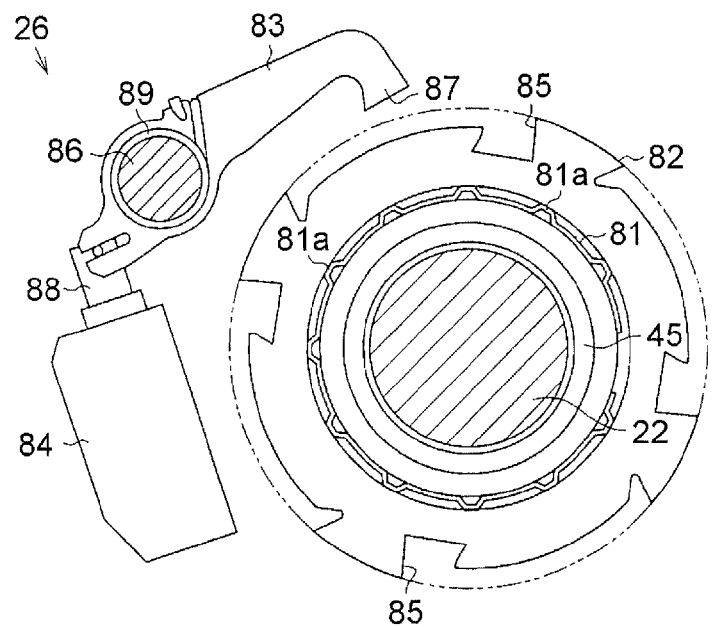
FIG. 4 is a sectional view taken along a line A-A of FIG. 2, which shows a lock mechanism according to the first embodiment.

As shown in FIG. 4, the lock mechanism 26 includes a lock holder 82 provided around the motor shaft 45 through a tolerance ring 81 so as to be rotatable together with the motor shaft 45, a lock arm 83 that is able to restrain rotation of the lock holder 82, and a solenoid 84 that drives the lock arm 83.

The lock holder 82 is formed in a substantially annular shape, and fixed to an axial end portion of the motor shaft 45. A plurality of (in this embodiment, four) engaging grooves 85 are formed in an outer periphery of the lock holder 82. The engaging grooves 85 are open toward both sides of the lock holder 82 in a thickness direction (the axial direction), and extend in the circumferential direction. The engaging grooves 85 are formed at four locations in the outer periphery of the lock holder 82 at equal angular intervals (of 90 degrees).

The lock arm 83 is supported with respect to a support shaft 86 that is arranged radially outside the lock holder 82 so that the lock arm 83 is able to pivot about a shaft center of the support shaft 86. An engaging lug 87, which projects toward the outer periphery of the lock holder 82, is provided in one end of the lock arm 83. A shaft-shaped plunger 88 is connected to the other end of the lock arm 83, and is configured so as to be able to move forward and backward along an axial direction of the plunger 88 as the solenoid 84 is driven. The support shaft 86 and the solenoid 84 are fixed to the housing 21 (see FIG. 2). The lock arm 83 is urged by an elastic force of a torsion coil spring 89 fitted to a periphery of the support shaft 86 so that an engaging lug 87-side end portion of the lock arm 83 pivots toward the lock holder 82-side. The lock arm 83 restrains rotation of the motor shaft 45 when the engaging lug 87 is inserted in the engaging groove 85 and engaged with the engaging groove 85 in the circumferential direction.

The tolerance ring 81 is formed by bending a belt-shaped metallic plate into a substantially C shape, and has a plurality of spring portions 81a projecting toward a radially outer side. The tolerance ring 81 restricts relative rotation between the motor shaft 45 and lock holder 82 based on friction resistance between an outer periphery (the spring portions 81a) of the tolerance ring 81 and the lock holder 82. On the other hand, when torque equal to or larger than a given value is input, the outer periphery of the tolerance ring 81 serves as a sliding surface. Thus, as the tolerance ring 81 rotates relative to the lock holder 82, the tolerance ring 81 allows relative rotation between the motor shaft 45 and the lock holder 82, in other words, the tolerance ring 81 functions as a torque limiter.

In the lock mechanism 26 thus configured, as the solenoid 84 is energized, the lock arm 83 is driven so that the engaging lug 87 of the lock arm 83 is disposed radially outside the lock holder 82 against an elastic force of the torsion coil spring 89. Thus, an unlocked state is achieved in which the motor shaft 45 is rotatable with respect to the housing 21. In the unlocked state, the motor-driven rotation is added to the rotation of the first shaft 22 based on a steering operation, and the resultant rotation is transmitted to the second shaft 23 as described above.

On the other hand, as energization of the solenoid 84 is stopped, the engaging lug 87-side end portion of the lock arm 83 pivots toward the lock holder 82-side. Thus, as the engaging lug 87 of the lock arm 83 is inserted in the engaging groove 85, a locked state is achieved in which the lock holder 82 is restrained so as not to rotate with respect to the housing 21 that is fixed to the vehicle body. In the locked state, when power supply to the motor 24 is stopped, the motor shaft 45 is prevented from dragging with respect to the housing 21, and torque is thus transmittable between the first shaft 22 and the second shaft 23. In the locked state, when a malfunction occurs in the nutation gear mechanism 25, for example, when a foreign material is caught by the nutation gear mechanism 25, and the first shaft 22 and the second shaft 23 are unable to rotate relative to the motor shaft 45, the first shaft 22 and the second shaft 23 rotate together with the motor shaft 45 relative to the housing 21 as torque equal to or larger than a given value is input. Therefore, it is possible to continue the steering operation even when a malfunction occurs.

For smooth operation of the nutation gear mechanism 25, it is important to maintain a good meshing state between the first gear 61 and the second gear 76, and between the fourth gear 62 and the third gear 77 by applying a given preload to the nutation gear mechanism 25. Thus, the preload applying mechanism 79 according to this embodiment is configured so as to be able to adjust and maintain an axial preload applied from outside to the nutation gear mechanism 25 in a state where the transmission ratio variable device 15 is assembled.

As shown in FIG. 2 and FIG. 3, the second shaft 23 includes a shaft portion 91 having a shaft shape and projecting outside the housing 21, a bottomed cylindrical housing portion 92 provided on the arrow a1-side of the shaft portion 91, and a cylindrical portion 93 that is provided on the arrow a1-side of the housing portion 92, and has a cylindrical shape with an outside diameter larger than an outside diameter of the housing portion 92. In the shaft portion 91, a communicating hole 94 is formed so as to extend through the shaft portion 91 in the axial direction. An outside and an inside of the housing portion 92 communicate with each other through the communicating hole 94. As shown in FIG. 3, an internal thread portion 95 is formed in an inner periphery of the housing portion 92. The internal thread portion 95 according to this embodiment includes a small-diameter internal thread portion 95a provided on a shaft portion 91-side, and a large-diameter internal thread portion 95b that is provided on the arrow a1-side of the shaft portion 91 and set so that an inside diameter of a thread ridge is larger than an inside diameter of a thread ridge of the small-diameter internal thread portion 95a. The connecting cylinder 67 is connected to an arrow a1-side end portion of the cylindrical portion 93 so that the connecting cylinder 67 is rotatable together with the cylindrical portion 93.

The preload applying mechanism 79 includes a preload adjusting plug 101 that is screwed to the large-diameter internal thread portion 95b and arranged inside the housing portion 92, an annular raceway collar 103 that holds a thrust needle 102 serving as a bearing between the raceway collar 103 and the first gear 61 so that the thrust needle 102 is able to roll, and a wave washer 104 that serves as an elastic member and that is arranged between the preload adjusting plug 101 and the raceway collar 103. The wave washer 104 is compressed by a given amount between the preload adjusting plug 101 and the raceway collar 103, and applies a given preload to the nutation gear mechanism 25 by pressing the first gear 61 to the fourth gear 62-side by using an elastic force of the wave washer 104. In other words, in this embodiment, preload applying means is constituted by the preload adjusting plug 101 and the wave washer 104. The raceway collar 103 and the thrust needle 102 are arranged inside the cylindrical portion 93, and a bush 105 is provided between the raceway collar 103 and the cylindrical portion 93.

The preload adjusting plug 101 is formed in a disc shape, and an external thread portion 106, which meshes with the large-diameter internal thread portion 95b, is formed on an outer periphery of the preload adjusting plug 101. In the preload adjusting plug 101, a protrusion 107 projecting toward the arrow a2-side is formed at a location that faces the communicating hole 94. In the preload adjusting plug 101, an operation hole 108 is formed so as to extend through the preload adjusting plug 101 in the axial direction, at a position facing the communicating hole 94. The operation hole 108 has a shape (for example, a hexagonal shape) that allows the preload adjusting plug 101 to rotate when a tool (not shown) is engaged with the operation hole 108 in the circumferential direction. Thus, the preload adjusting plug 101 is able to be operated (screwed forward and backward) from outside through the communicating hole 94. Thus, it is possible to adjust an amount of compression of the wave washer 104 by changing a position of the preload adjusting plug 101. In other words, it is possible to adjust the axial preload applied to the nutation gear mechanism 25 in accordance with the position of the preload adjusting plug 101 in the housing portion 92.

The preload applying mechanism 79 also includes a lock nut 111 that serves as locking means, and that is screwed to the small-diameter internal thread portion 95a. The lock nut 111 is formed in an annular shape and arranged on an outer periphery of the protrusion 107. On an outer periphery of the lock nut 111, an external thread portion 112, which is screwed to the small-diameter internal thread portion 95a, is formed. The lock nut 111 is screwed to the small-diameter internal thread portion 95a so as to press the preload adjusting plug 101 toward the arrow a1-side (toward the nutation gear mechanism 25). Thus, the external thread portion 106 of the preload adjusting plug 101 and the large-diameter internal thread portion 95b are in close contact with each other. This restricts loosening of the preload adjusting plug 101 (restricts the preload adjusting plug 101 from rotating so as to move toward the arrow a2-side).

Figure 5:
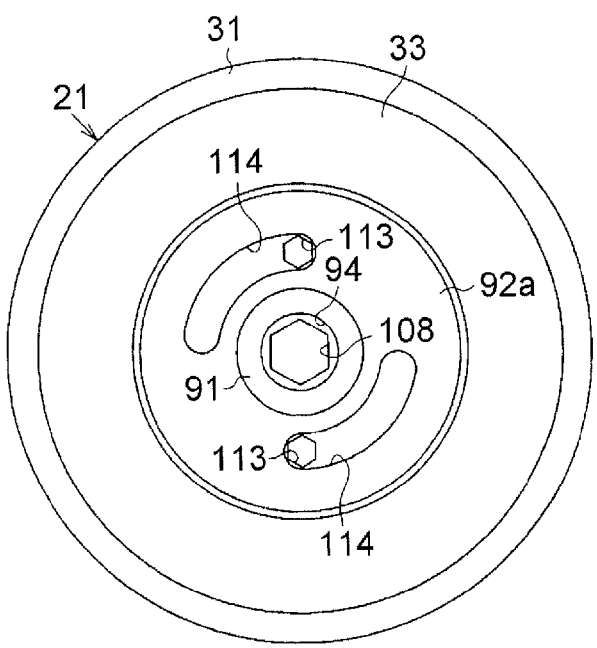
FIG. 5 is a side view of the transmission ratio variable device according to the first embodiment, which is seen from an output shaft-side.

As shown in FIG. 3 and FIG. 5, in the lock nut 111, a plurality of operation holes 113 are formed at equal angular intervals in the circumferential direction and extend through the lock nut 111 in the axial direction. Meanwhile, in a bottom portion 92a of the housing portion 92, a plurality of through holes 114, which extend through the bottom portion 92a of the housing portion 92 in the axial direction, are formed at positions that face the operation holes 113. Each of the through holes 114 is formed in an arc shape extending over a given circumferential range. Thus, it is possible to insert a tool (not shown) into the operation holes 113 of the lock nut 111 through the through holes 114, and to rotate the lock nut 111 within the given range.

Next, preload adjustment operation (action) of the preload applying mechanism according to this embodiment will be described. After assembling the transmission ratio variable device 15, an operator inserts a tool into the operation hole 108 of the preload adjusting plug 101 from outside through the communicating hole 94 of the shaft portion 91, and rotates (operates) the preload adjusting plug 101 with given fastening toque that is previously determined based on experiments and the like. Thus, the preload adjusting plug 101 is moved to a position such that the wave washer 104 is compressed by a given amount between the preload adjusting plug 101 and the raceway collar 103 regardless of an assembly error and the like, and a given preload is applied to the nutation gear mechanism 25. Next, the operator inserts a tool into the operation holes 113 of the lock nut 111 through the through holes 114, and rotates the lock nut 111 so that the lock nut 111 presses the preload adjusting plug 101 toward the nutation gear mechanism 25. Accordingly, the external thread portion 106 and the large-diameter internal thread portion 95b (the internal thread portion 95) are in close contact with each other, and thus, loosening of the preload adjusting plug 101 is restricted.

As described so far, according to this embodiment, the following effects are obtained. (1) As it is possible to operate the preload adjusting plug 101 from outside, the axial preload applied to the nutation gear mechanism 25 is adjustable in a state where the transmission ratio variable device 15 is assembled. Therefore, variation in the preload applied to the nutation gear mechanism 25 is reduced even when there are an assembly error and the like.

(2) The axial preload is applied to the nutation gear mechanism 25 by using the elastic force of the wave washer 104. Therefore, a change in the preload due to a change of the position of the preload adjusting plug 101 is small as compared to a case where a preload is directly applied by the preload adjusting plug 101. This lowers a required level of positional accuracy of the preload adjusting plug 101, thereby making it easier to adjust the preload applied to the nutation gear mechanism 25. Also, the wave washer 104 is able to absorb vibration that occurs in the nutation gear mechanism 25, thereby preventing occurrence of noise.

(3) The preload adjusting plug 101 is screwed to the second shaft 23. However, since the preload applying mechanism 79 is configured so as to restrict loosening of the preload adjusting plug 101, the preload adjusting plug 101 is not loosened due to vibration and the like while in use, an adjusted preload is maintained, and a good meshing state of the nutation gear mechanism 25 is maintained.

(4) Loosening of the preload adjusting plug 101 is restricted by the lock nut 111 that is screwed to the housing portion 92 of the second shaft 23 so as to press the preload adjusting plug 101 toward the nutation gear mechanism 25. Therefore, by loosening the lock nut 111, the position of the preload adjusting plug 101 is changed repeatedly to adjust the preload.

Next, a second embodiment will be described with reference to the drawings. For convenience of explanation, the same reference numerals are assigned to the same constituents as the constituents of the foregoing first embodiment, and description of such constituents will be omitted.

Figure 6:
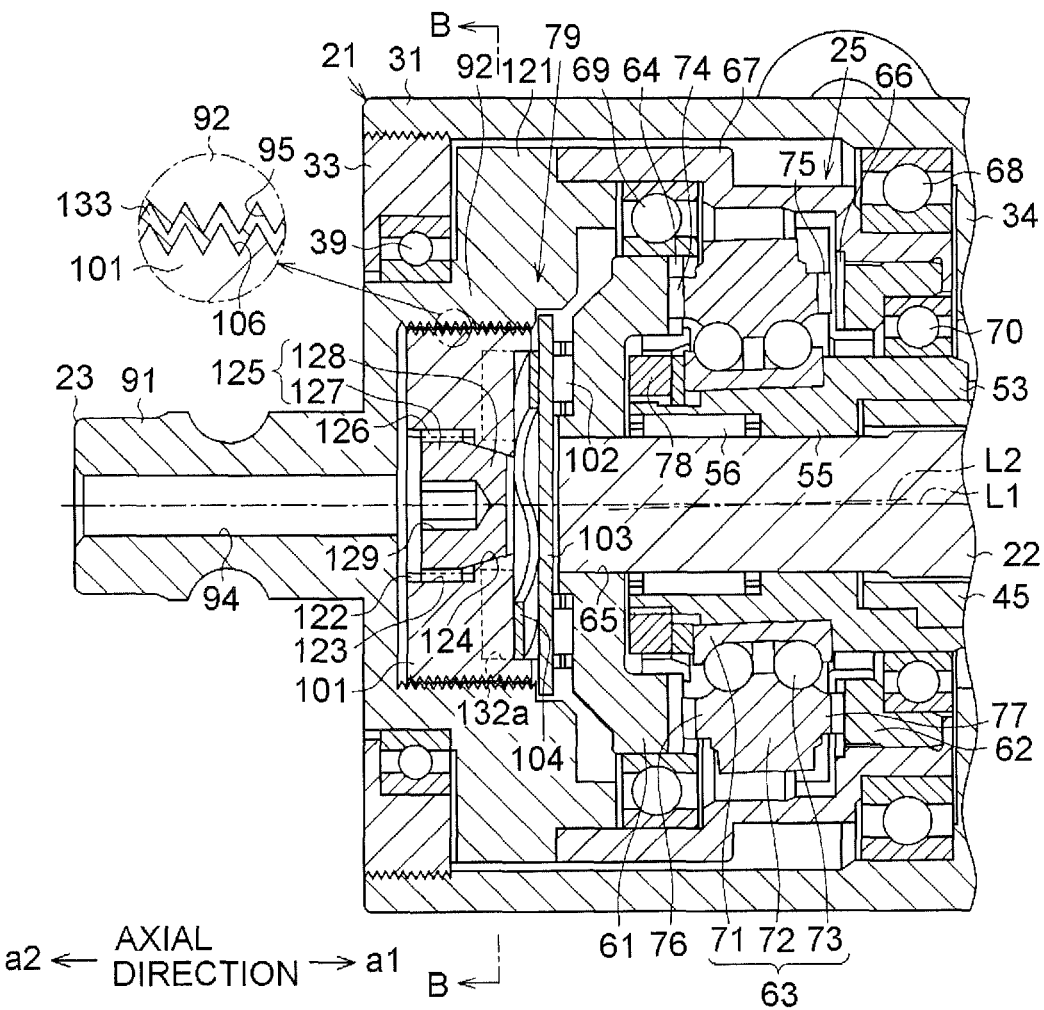
FIG. 6 is an enlarged sectional view of a transmission ratio variable device according to a second embodiment.

As shown FIG. 6, an annular flange portion 121 that extends toward a radially outer side is formed in an arrow a1-side end portion of a housing portion 92, and a connecting cylinder 67 is connected to the flange portion 121. An internal thread portion 95 according to this embodiment is formed such that an inside diameter thereof is substantially uniform over the entire internal thread portion 95 in the axial direction.

In a center of a preload adjusting plug 101, an engaging hole 123 is formed. The engaging hole 123 is open toward the arrow a2-side, and an internal spline 122 is formed in an inner periphery of the engaging hole 123. Also, in the preload adjusting plug 101, a press-fitting hole 124 is formed. The press-fitting hole 124 axially extends through the preload adjusting plug 101 and is open to a bottom surface of the engaging hole 123. The press-fitting hole 124 is formed in a tapered shape such that an inside diameter of the press-fitting hole 124 is gradually reduced toward the arrow a1-side from the arrow a2-side. A wave washer 104 is compressed by a given amount between the preload adjusting plug 101 and a raceway collar 103 similarly to the foregoing first embodiment, and applies a given preload to a nutation gear mechanism 25 by using an elastic force of the wave washer 104.

A preload applying mechanism 79 includes a press-fitting member 125 that is press-fitted into the press-fitting hole 124 so as to deform the preload adjusting plug 101 so that a diameter of the preload adjusting plug 101 is increased. More specifically, the press-fitting member 125 has a fitting portion 127 in which an external spline 126 corresponding to the internal spline 122 is formed, and a press-fitting portion 128 that projects from the fitting portion 127 toward the arrow a1-side and is inserted into the press-fitting hole 124. As the fitting portion 127 is fitted to the inner periphery of the engaging hole 123 through splines, the press-fitting member 125 is rotatable together with the preload adjusting plug 101 and movable in an axial direction with respect to the preload adjusting plug 101. The press-fitting portion 128 is formed in a tapered shape such that an outside diameter of the press-fitting portion 128 is gradually reduced toward the arrow a1-side from the arrow a2-side. A maximum outside diameter of the press-fitting portion 128 (an outside diameter of an arrow a2-side end portion of the press-fitting portion 128) is set to be larger than a maximum inside diameter of the press-fitting hole 124 (an inside diameter of an arrow a2-side end portion of the press-fitting hole 124). In the press-fitting member 125, an operation hole 129, which is open toward the arrow a2-side, is formed at a position facing a communicating hole 94. The operation hole 129 is formed in a shape that allows the preload adjusting plug 101 to rotate when a tool (not shown) is engaged with the operation hole 129 in the circumferential direction, and that allows the press-fitting member 125 to be pressed toward the arrow a1-side.

Figure 7:
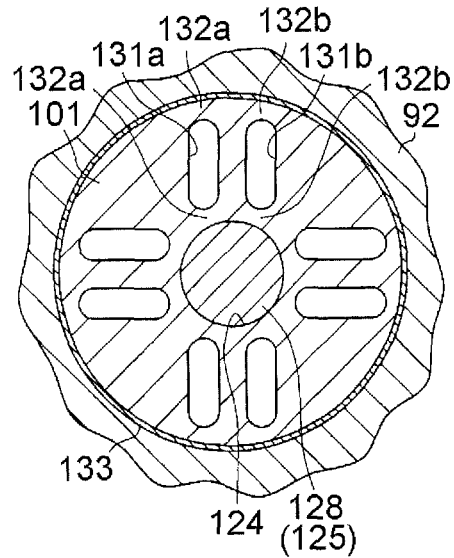
FIG. 7 is a sectional view taken along a line B-B of FIG. 6, which shows the vicinity of a preload adjusting plug in the transmission ratio variable device according to the second embodiment.

As shown in FIG. 6 and FIG. 7, in an arrow a1-side end face of the preload adjusting plug 101, a plurality of pairs of elongated holes 131a and 131b are provided at equal angular intervals in the circumferential direction. The elongated holes 131a and 131b in each pair extend substantially along a radial direction, and are arranged to be parallel to each other. Therefore, in the preload adjusting plug 101, bridge portions 132a on both sides of each elongated hole 131a in a longitudinal direction thereof and bridge portions 132b on both sides of each elongated hole 131b in a longitudinal direction thereof have lower mechanical strength than other parts so as to be deformed easily in the radial direction. A diameter of the preload adjusting plug 101 is increased when parts between the elongated holes 131a and 131b and between the bridge portions 132a and 132b in the preload adjusting plug 101 are mainly displaced radially outwardly as the press-fitting member 125 is press-fitted. In other words, in this embodiment, the bridge portions 132a and 132b correspond to a low-strength portion. On an outer periphery of an external thread portion 106 of the preload adjusting plug 101, a soft member 133 is provided. The soft member 133 has lower mechanical strength than mechanical strength of the preload adjusting plug 101. In other words, the soft member 133 is provided in a screwed portion between the housing portion 92 of the second shaft 23 and the preload adjusting plug 101. In this embodiment, the preload adjusting plug 101 is made of a metallic material such as iron, and the soft member 133 is made of a metallic material such as copper.

As the press-fitting member 125 is press-fitted into the press-fitting hole 124, the preload adjusting plug 101 is deformed so that the diameter of the preload adjusting plug 101 is increased. Therefore, a small clearance between the external thread portion 106 and the internal thread portion 95 is filled, and loosening of the preload adjusting plug 101 is thus restricted. In other words, in this embodiment, locking means is constituted by the press-fitting member 125 and the soft member 133.

Next, a preload adjustment operation (action) of the preload applying mechanism according to this embodiment will be described. After assembling the transmission ratio variable device 15, an operator inserts a tool into the operation hole 129 of the press-fitting member 125 from outside through the communicating hole 94 of the shaft portion 91, and rotates the preload adjusting plug 101 together with the press-fitting member 125 with given tightening torque that is previously determined based on experiments and the like. Thus, similarly to the foregoing first embodiment, a given elastic force is generated in the wave washer 104, and a given preload is applied to the nutation gear mechanism 25. Then, the operator pushes in the press-fitting member 125 using a tool (not shown). Hence, the preload adjusting plug 101 is deformed so that the diameter of the preload adjusting plug 101 is increased, and the small clearance between the external thread portion 106 and the internal thread portion 95 is filled, and thus, loosening of the preload adjusting plug 101 is restricted.

As described so far, according to this embodiment, the following effects are obtained in addition to the effects (1) to (3) of the foregoing first embodiment. (5) The elongated holes 131a and 131b are formed in the preload adjusting plug 101. The bridge portions 132a with low mechanical strength are provided on both sides of each elongated hole 131a in the longitudinal direction, and the bridge portions 132b with low mechanical strength are provided on both sides of each elongated hole 131b in the longitudinal direction. Therefore, the preload adjusting plug 101 is deformed easily.

(6) The soft member 133 is provided in the screwed portion between the housing portion 92 and the preload adjusting plug 101. Therefore, the small clearance between the external thread portion 106 and the internal thread portion 95 is filled securely by the soft member 133. Thus, it is possible to more reliably restrict loosening of the preload adjusting plug 101.

Next, a third embodiment will be described with reference to the drawings. For convenience of explanation, the same reference numerals are assigned to the same constituents as the constituents of the foregoing first embodiment, and description of such constituents will be omitted.

Figure 8:
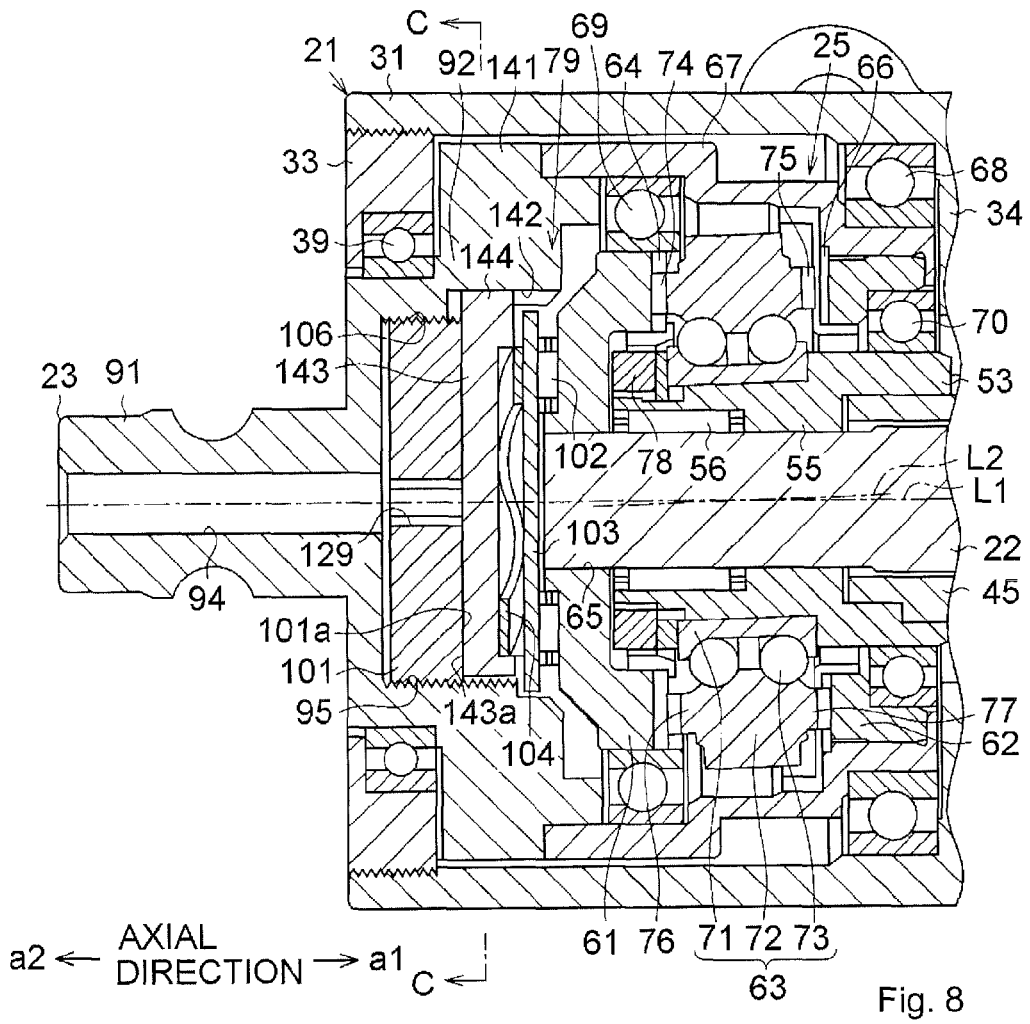
FIG. 8 is an enlarged sectional view of a transmission ratio variable device according to a third embodiment.
Figure 9:
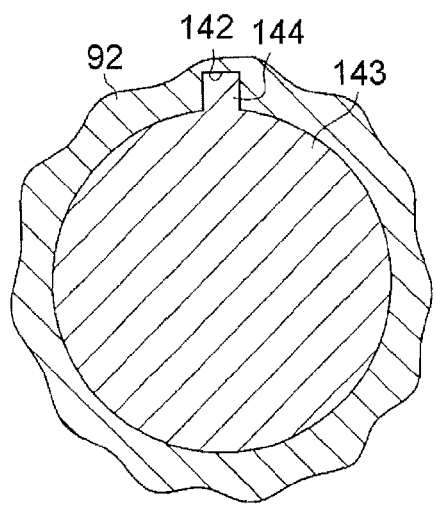
FIG. 9 is an enlarged sectional view taken along a line C-C of FIG. 8, which shows the vicinity of a friction plate in the transmission ratio variable device according to the third embodiment.

As shown in FIG. 8, an annular flange portion 141 that extends toward a radially outer side is formed in an arrow a1-side end portion of a housing portion 92, and a connecting cylinder 67 is connected to the flange portion 141. An internal thread portion 95 according to this embodiment is formed such that an inside diameter thereof is substantially uniform over the entire internal thread portion 95 in the axial direction. As shown in FIG. 8 and FIG. 9, in the housing portion 92, a groove-shaped engaging recessed portion 142 is formed. The engaging recessed portion 142 extends in the axial direction and is open toward the arrow a1-side.

A preload applying mechanism 79 includes a friction plate 143 arranged between a preload adjusting plug 101 and a wave washer 104. The wave washer 104 is compressed by a given amount between the friction plate 143 and a raceway collar 103, and applies a given preload to a nutation gear mechanism 25 by using an elastic force of the wave washer 104. The friction plate 143 is formed in a disc shape. On an outer periphery of the friction plate 143, an engaging projecting portion 144 is formed. The engaging projecting portion 144 projects to a radially outer side and is inserted in the engaging recessed portion 142. As the engaging projecting portion 144 is engaged with the engaging recessed portion 142 by engagement between a projection and a recess, the friction plate 143 is restricted from rotating relative to a second shaft 23. A contact surface 143a of the friction plate 143, which contacts the preload adjusting plug 101, has been subjected to a high μ process for increasing the friction coefficient μ of the contact surface 143a. In this embodiment, small projections and recesses are formed on the contact surface 143a by knurling, and the coefficient of friction of the contact surface 143a is thus increased. As the preload adjusting plug 101 is frictionally engaged with the friction plate 143 that is restricted from rotating with respect to the second shaft 23, loosening of the preload adjusting plug 101 is restricted. In other words, in this embodiment, locking means is constituted by the friction plate 143.

A preload adjustment operation (action) according to this embodiment will be described. Similarly to the foregoing first embodiment, after assembling a transmission ratio variable device 15, an operator inserts a tool into an operation hole 129 of the preload adjusting plug 101 from outside through a communicating hole 94 of a shaft portion 91, and rotates the preload adjusting plug 101 with given tightening torque. Accordingly, the wave washer 104 is compressed by a given amount, and a given preload is applied to the nutation gear mechanism 25, and in addition, the preload adjusting plug 101 and the friction plate 143 are frictionally engaged with each other. Thus, loosening of the preload adjusting plug 101 is restricted. The given tightening torque is set to be larger than the given tightening torque in the foregoing first embodiment.

As described so far, according to this embodiment, the following effect is obtained in addition to the effects (1) to (3) of the foregoing first embodiment. (7) Since the contact surface 143a of the friction plate 143 has been subjected to the high μ process for increasing the friction coefficient μ of the contact surface 143a, a frictional force that acts between the preload adjusting plug 101 and the friction plate 143 is increased. Therefore, it is possible to more reliably restrict loosening of the preload adjusting plug 101.

Next, a fourth embodiment will be described with reference to the drawings. For convenience of explanation, the same reference numerals are assigned to the same constituents as the constituents of the foregoing first embodiment, and description of such constituents will be omitted.

Figure 10:
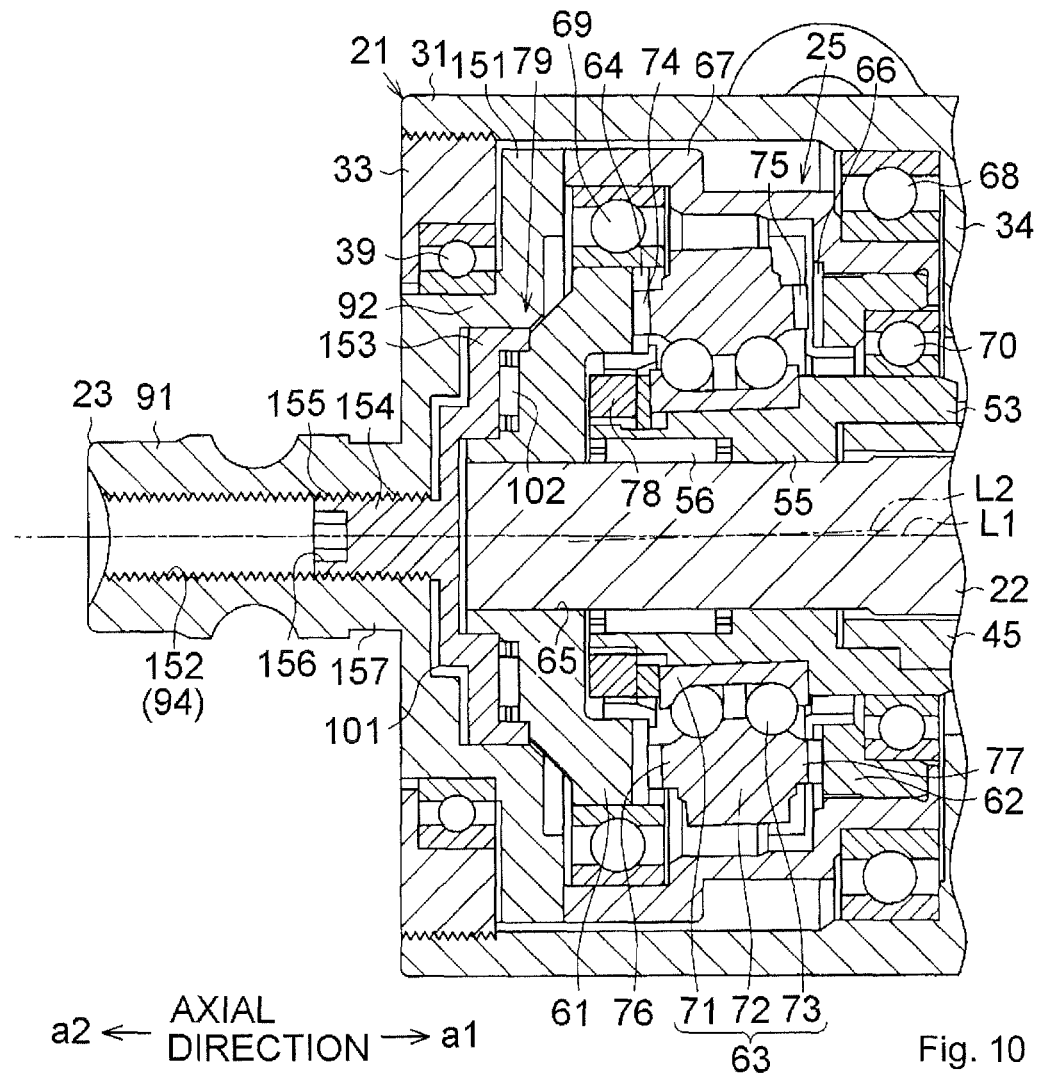
FIG. 10 is an enlarged sectional view of a transmission ratio variable device according to a fourth embodiment.

As shown in FIG. 10, an annular flange portion 151 that extends toward a radially outer side is formed in an arrow a1-side end portion of a housing portion 92, and a connecting cylinder 67 is connected to the flange portion 151. An internal thread portion 152 is formed in an inner periphery of a shaft portion 91. There is no internal thread portion formed in the inner periphery of the housing portion 92 according to this embodiment.

A preload applying mechanism 79 does not include an elastic member such as a wave washer. The preload applying mechanism 79 applies a preload to a nutation gear mechanism 25 as a preload adjusting plug 101 directly presses a first gear 61 through a thrust needle 102. More specifically, in the preload adjusting plug 101, a raceway portion 153 is formed. The raceway portion 153 extends toward a radially outer side from an arrow a1-side end portion of the preload adjusting plug 101, and retains the thrust needle 102 so that the thrust needle 102 is able to roll. In the preload adjusting plug 101, a projecting portion 154 is formed. The projecting portion 154 projects from a center of the preload adjusting plug 101 to the arrow a2-side, and is inserted in a communicating hole 94 of the shaft portion 91. The projecting portion 154 is formed in a shaft shape. On an outer periphery of the projecting portion 154, an external thread portion 155, which is screwed to the internal thread portion 152, is formed. In the projecting portion 154, an operation hole 156, which is open toward the arrow a2-side, is formed. The operation hole 156 has a shape that allows the preload adjusting plug 101 to rotate when a tool (not shown) is engaged with the operation hole 156 in the circumferential direction. As the projecting portion 154 is screwed into the communicating hole 94, the preload adjusting plug 101 is arranged at a given position inside the housing portion 92, and the preload adjusting plug 101 presses the first gear 61 toward a fourth gear 62-side through the thrust needle 102. Thus, the preload adjusting plug 101 applies a given preload to the nutation gear mechanism 25. In other words, according to this embodiment, preload applying means is constituted by the preload adjusting plug 101.

In a part of the shaft portion 91, to which the projecting portion 154 is screwed, a swaged portion 157 is formed by swaging the shaft portion 91 so that a diameter of the shaft portion 91 is reduced. Therefore, a small clearance between the external thread portion 155 and a position in the internal thread portion 152 corresponding to the swaged portion 157 is filled, and loosening of the preload adjusting plug 101 is thus restricted. In other words, according to this embodiment, locking means is constituted by the swaged portion 157.

Next, a preload adjustment operation (action) of the preload applying mechanism according to this embodiment will be described. Similarly to the foregoing first embodiment, after assembling a transmission ratio variable device 15, an operator inserts a tool into the operation hole 156 of the preload adjusting plug 101 through the communicating hole 94 of the shaft portion 91, and rotates the preload adjusting plug 101 with given tightening torque. Thus, an appropriate preload is applied to the nutation gear mechanism 25 by the preload adjusting plug 101. Then, the operator swages the part of the shaft portion 91, to which the projecting portion 154 is screwed, from an outer periphery. Accordingly, the small clearance between the external thread portion 155 and the internal thread portion 152 is filled, and thus, loosening of the preload adjusting plug 101 is restricted.

As described so far, according to this embodiment, the following effect is obtained in addition to the effects (1) and (3) of the foregoing first embodiment.

(8) Loosening of the preload adjusting plug 101 is restricted because the swaged portion 157 is formed in the part of the shaft portion 91, to which the projecting portion 154 is screwed. Therefore, loosening of the preload adjusting plug 101 is restricted with a simple structure without adding a component separately.

The foregoing embodiments may also be implemented in the following forms in which changes are made to the foregoing embodiments as appropriate.

In the foregoing first embodiment, the internal thread portion 95 is constituted by the small-diameter internal thread portion 95a and the large-diameter internal thread portion 95b. However, an inside diameter of the internal thread portion 95 may be substantially uniform over the entire internal thread portion 95 in the axial direction.

In the foregoing second embodiment, the soft member 133 is formed of a metallic material such as copper. However, the present invention is not limited to this, and the soft member 133 may be formed of another material such as resin or rubber as long as the soft member 133 has lower mechanical strength than mechanical strength of the preload adjusting plug 101. Alternatively, the soft member 133 may not be provided between the external thread portion 106 and the internal thread portion 95.

In the foregoing second embodiment, the elongated holes 131a and 131b are formed in the preload adjusting plug 101, and thus, the bridge portions 132a with low mechanical strength are formed on both sides of each elongated hole 131a in the longitudinal direction and the bridge portions 132b with low mechanical strength are formed on both sides of each elongated hole 131b in the longitudinal direction. However, the present invention is not limited to this, low-strength portions with low mechanical strength may be formed in the preload adjusting plug 101 by forming circular holes or grooves other than the elongated holes 131a and 131b. The elongated holes 131a and 131b may not be formed in the preload adjusting plug 101, and the low-strength portion may not be provided.

In the foregoing second embodiment, the press-fitting hole 124 and the press-fitting portion 128 are formed in tapered shapes. However, the present invention is not limited to this, and the shapes of the press-fitting hole 124 and the press-fitting portion 128 may be changed as appropriate as long as the diameter of the preload adjusting plug 101 is increased by pressing the press-fitting portion 128 into the press-fitting hole 124.

In the foregoing third embodiment, knurling is used as the high μ process for increasing the friction coefficient μ performed on the contact surface 143a of the friction plate 143. However, the present invention is not limited to this, and other machining methods such as graining may be used. As the high μ process for increasing the friction coefficient μ, plating may be used to cover the contact surface 143a with a material having a high friction coefficient.

In the foregoing third embodiment, the high μ process for increasing the friction coefficient μ is performed on the contact surface 143a of the friction plate 143. However, the present invention is not limited to this, and the high μ process for increasing the friction coefficient μ may be performed only on a contact surface 101a (see FIG. 8) of the preload adjusting plug 101, which contacts the friction plate 143, or on both of the contact surfaces 101a and 143a. The high μ process for increasing the friction coefficient μ may not be performed on the contact surfaces 101a and 143a.

Figure 11:
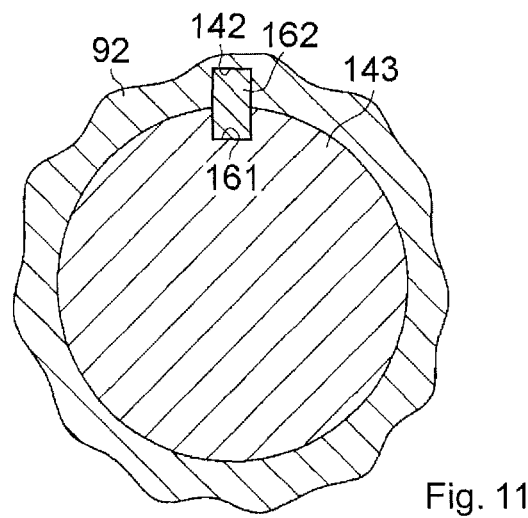
FIG. 11 is an enlarged sectional view of the vicinity of a friction plate in a transmission ratio variable device according to another example.

In the foregoing third embodiment, the engaging projecting portion 144 is formed in the friction plate 143, and rotation of the friction plate 143 with respect to the second shaft 23 is restricted as the engaging projecting portion 144 is engaged with the engaging recessed portion 142 of the housing portion 92. However, the present invention is not limited to this. For example, as shown in FIG. 11, an engaging recessed portion 161 may be formed on an outer periphery of the friction plate 143, and, an engaging member 162, which is engaged with both the engaging recessed portions 142 and 161, may be fixed to the housing portion 92 so as to restrict the rotation of the friction plate 143 with respect to the second shaft 23.

In the foregoing first to third embodiments, the wave washer 104 may not be provided, and the preload adjusting plug 101 may directly press the first gear 61 through the thrust needle 102a so as to apply a preload to the nutation gear mechanism 25. In the foregoing fourth embodiment, for example, a wave washer, a raceway collar, and a thrust needle may be provided between the preload adjusting plug 101 and the first gear 61, and a preload may be applied to the nutation gear mechanism 25 by an elastic force of the wave washer.

In the foregoing first to third embodiment, the wave washer 104 is used as the elastic member. However, the present invention is not limited to this, and a spring member such as a disc spring, or an elastic body such as rubber may be used.

In the foregoing first embodiment, the preload applying mechanism 79 may not include the lock nut 111, that is, locking means, which restricts loosening of the preload adjusting plug 101, and thus may not be configured to restrict loosening of the preload adjusting plug 101. Similarly, in the foregoing second to fourth embodiments, the preload applying mechanism 79 may not include the locking means, and thus may not be configured to restrict loosening of the preload adjusting plug 101.

In each of the foregoing embodiments, the steering wheel 2 may be connected to the second shaft 23-side, and the intermediate shaft 9 may be connected to the first shaft 22-side. In other words, the first shaft 22 may serve as an output shaft, and the second shaft 23 may serve as an input shaft.

In each of the foregoing embodiments, the present invention is applied to the transmission ratio variable device 15 of a type in which the housing 21 is not rotated by rotation of the first shaft 22 (an input shaft). However, the present invention is not limited to this, and may be applied to a transmission ratio variable device of a type in which a housing is rotated together with an input shaft.

In each of the foregoing embodiments, the present invention is applied to the transmission ratio variable device 15 for the vehicle steering system 1, but may also be applied to transmission ratio variable devices used for other purposes.

What is claimed is:

1. A transmission ratio variable device that adds motor-driven rotation to rotation of an input shaft by using a differential mechanism, and transmits resultant rotation to an output shaft, characterized in that:
   a nutation gear mechanism is employed as the differential mechanism, and the nutation gear mechanism includes a first gear that rotates together with the input shaft, a fourth gear that rotates together with the output shaft, and a nutation gear that includes a second gear that meshes with the first gear and a third gear that meshes with the fourth gear, the nutation gear rotating about an axis that is inclined to an axis of the first and fourth gears;
   one of the input shaft and the output shaft has a shaft portion projecting outside a housing that houses the nutation gear mechanism, and a communicating hole, through which an outside and an inside of the housing communicate with each other, is formed in the shaft portion; and
   the transmission ratio variable device includes preload applying means including a preload adjusting plug that is screwed to one of the input shaft and the output shaft and is able to be operated from outside through the communicating hole, the preload applying means applying an axial preload to the nutation gear mechanism in accordance with a position of the preload adjusting plug.

2. The transmission ratio variable device according to claim 1, wherein
   the preload applying means includes an elastic member that is arranged between the preload adjusting plug and the nutation gear mechanism and applies the axial preload to the nutation gear mechanism by being elastically deformed.

3. The transmission ratio variable device according to claim 1, comprising locking means that is able to restrict loosening of the preload adjusting plug.

4. The transmission ratio variable device according to claim 3, wherein
   a projecting portion, which is inserted in the communicating hole, is formed in the preload adjusting plug, and
   the locking means includes a swaged portion formed by swaging the shaft portion so that a diameter of the shaft portion is reduced.

5. The transmission ratio variable device according to claim 3, wherein
   the locking means includes a lock nut that is screwed to one of the input shaft and the output shaft so as to press the preload adjusting plug toward the nutation gear mechanism.

6. The transmission ratio variable device according to claim 3, wherein
   a press-fitting hole is formed in the preload adjusting plug, and
   the locking means includes a press-fitting member that is press-fitted into the press-fitting hole so as to deform the preload adjusting plug so that a diameter of the preload adjusting plug is increased.

7. The transmission ratio variable device according to claim 6, wherein
   the preload adjusting plug is provided with a low-strength portion in which mechanical strength is reduced.

8. The transmission ratio variable device according to claim 6, wherein
   the locking means includes a soft member that is provided in a screwed portion between one of the input shaft and the output shaft, and the preload adjusting plug, and the soft member has lower mechanical strength than mechanical strength of the preload adjusting plug.

9. The transmission ratio variable device according to claim 3, wherein
   the locking means includes a friction plate that is restricted from rotating relative to one of the input shaft and the output shaft by engagement between a projection and a recess, the friction plate contacting the preload adjusting plug.

10. The transmission ratio variable device according to claim 9, wherein
   at least one of contact surfaces between the preload adjusting plug and the friction plate has been subjected to a high $\mu$ process for increasing a friction coefficient of the at least one contact surface.

* * * * *